No. 781,887. PATENTED FEB. 7, 1905.
T. C. KING.
APPARATUS FOR THE REMOVAL AND UTILIZATION OF SLAG.
APPLICATION FILED JAN. 12, 1904.

7 SHEETS—SHEET 1.

WITNESSES:

INVENTOR
Thomas Cobb King
BY
ATTORNEY.

No. 781,887. PATENTED FEB. 7, 1905.
T. C. KING.
APPARATUS FOR THE REMOVAL AND UTILIZATION OF SLAG.
APPLICATION FILED JAN. 12, 1904.

7 SHEETS—SHEET 6.

WITNESSES:
H. W. Canby
A. M. Biddle

INVENTOR
Thomas Cobb King
BY
H. V. Henlon
ATTORNEY.

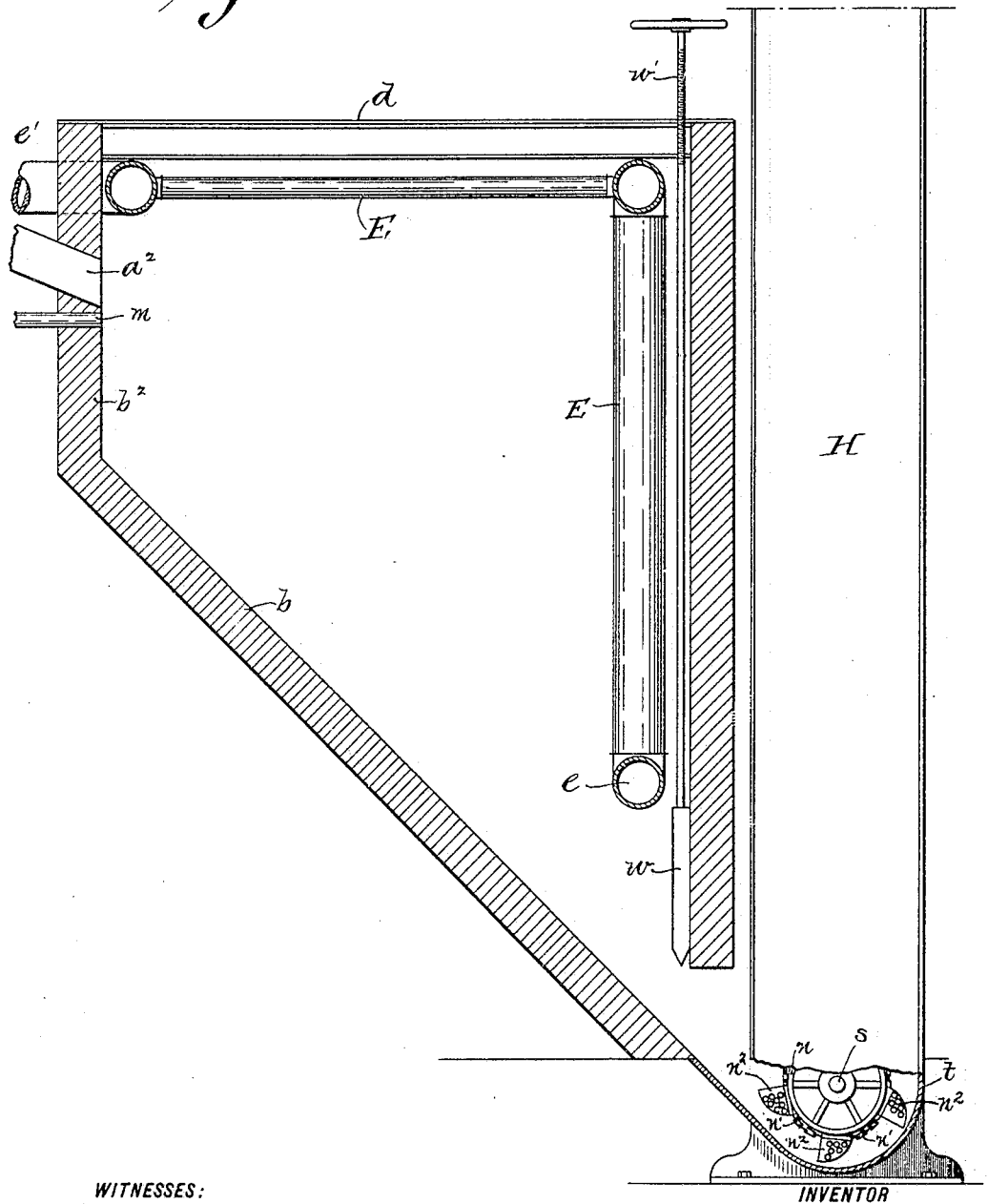

No. 781,887.

Patented February 7, 1905.

UNITED STATES PATENT OFFICE.

THOMAS COBB KING, OF MARION, ALABAMA, ASSIGNOR OF SIX-TENTHS TO JAMES W. McCLURE, OF PITTSBURG, PENNSYLVANIA.

APPARATUS FOR THE REMOVAL AND UTILIZATION OF SLAG.

SPECIFICATION forming part of Letters Patent No. 781,887, dated February 7, 1905.

Application filed January 12, 1904. Serial No. 188,757.

*To all whom it may concern:*

Be it known that I, THOMAS COBB KING, a citizen of the United States, residing at Marion, Perry county, State of Alabama, have invented certain new and useful Improvements in Apparatus for the Removal and Utilization of Slag Produced from the Smelting of Metal-Bearing Ores, of which the following is a full, clear, and exact description, reference being had to the accompanying drawings, forming part of this specification.

My invention relates to apparatus composing a system for the removal of slag from smelting-furnaces, and has for its object to provide means whereby slag from furnaces in which metal-bearing ores are reduced and smelted is delivered to a specific character of pit, the slag granulated therein, the heat produced thereby utilized for purposes hereinafter referred to, and the granulated slag removed from the pit to suitable bins, cars, conveyers, or other receivers, the several elements constituting an apparatus which is compact, simple in construction, of comparatively small first cost, and of great utility.

To these ends my invention consists of the apparatus composed of the several elements in combination constructed and operating to perform the aforesaid cycle of operations, as will be hereinafter fully described and the novel features elementally and in combination pointed out in the appended claims.

Figure 1:
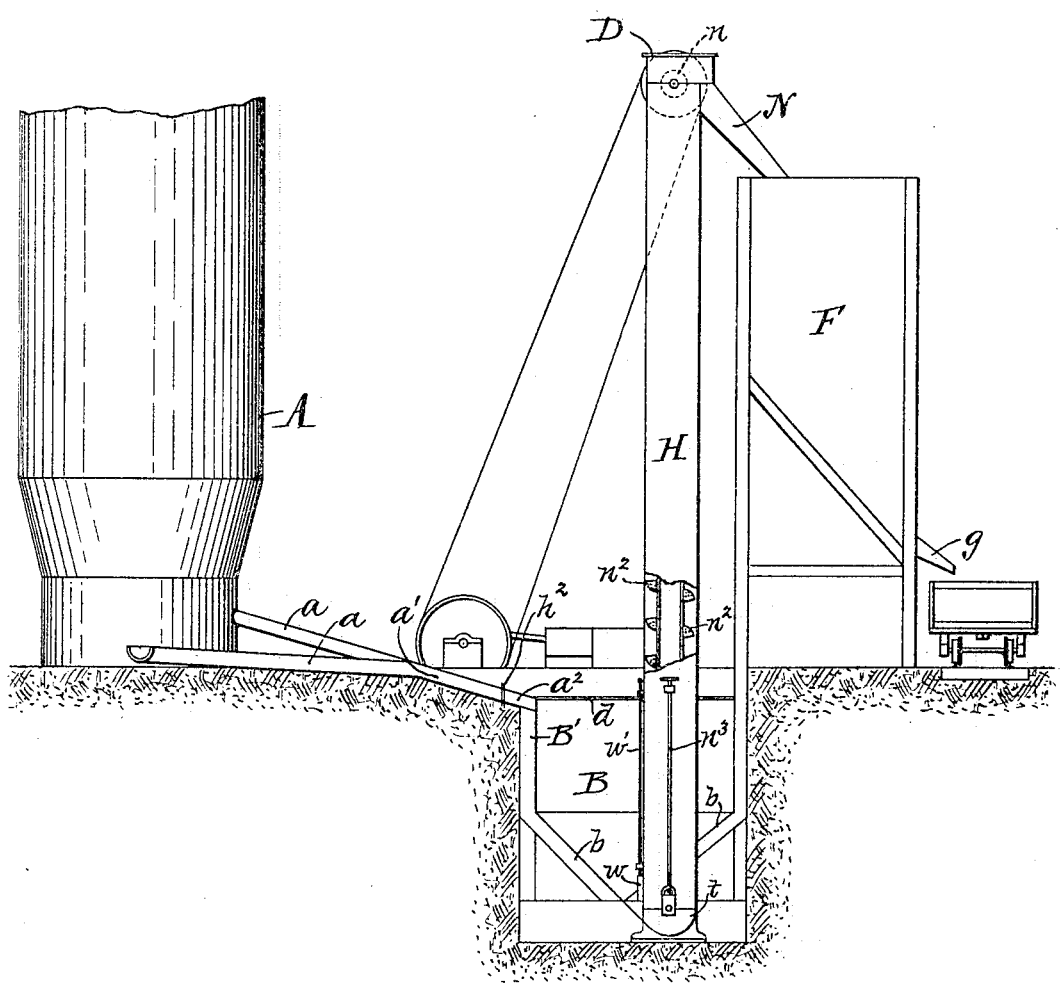
Figure 2:
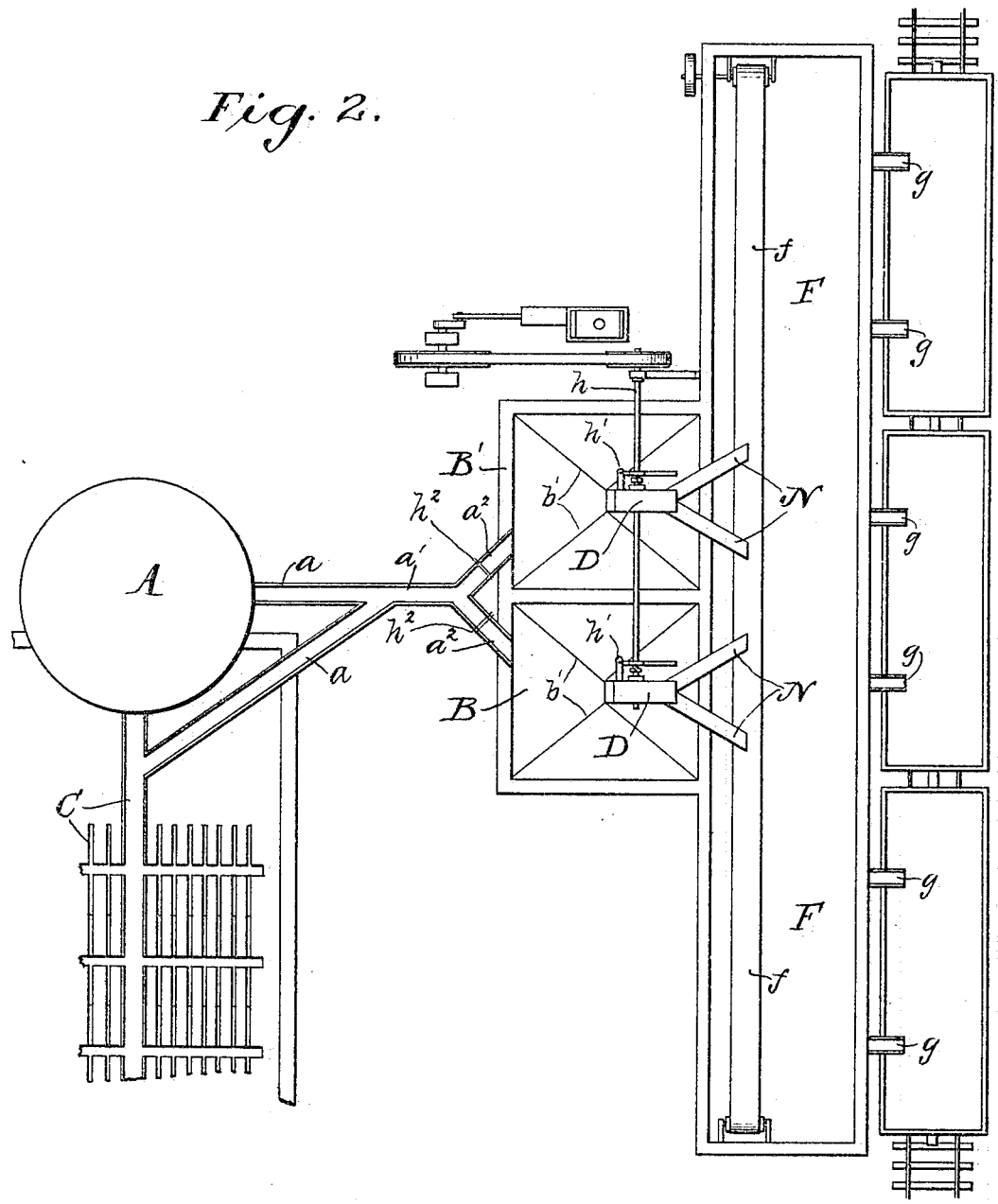
Figure 3:
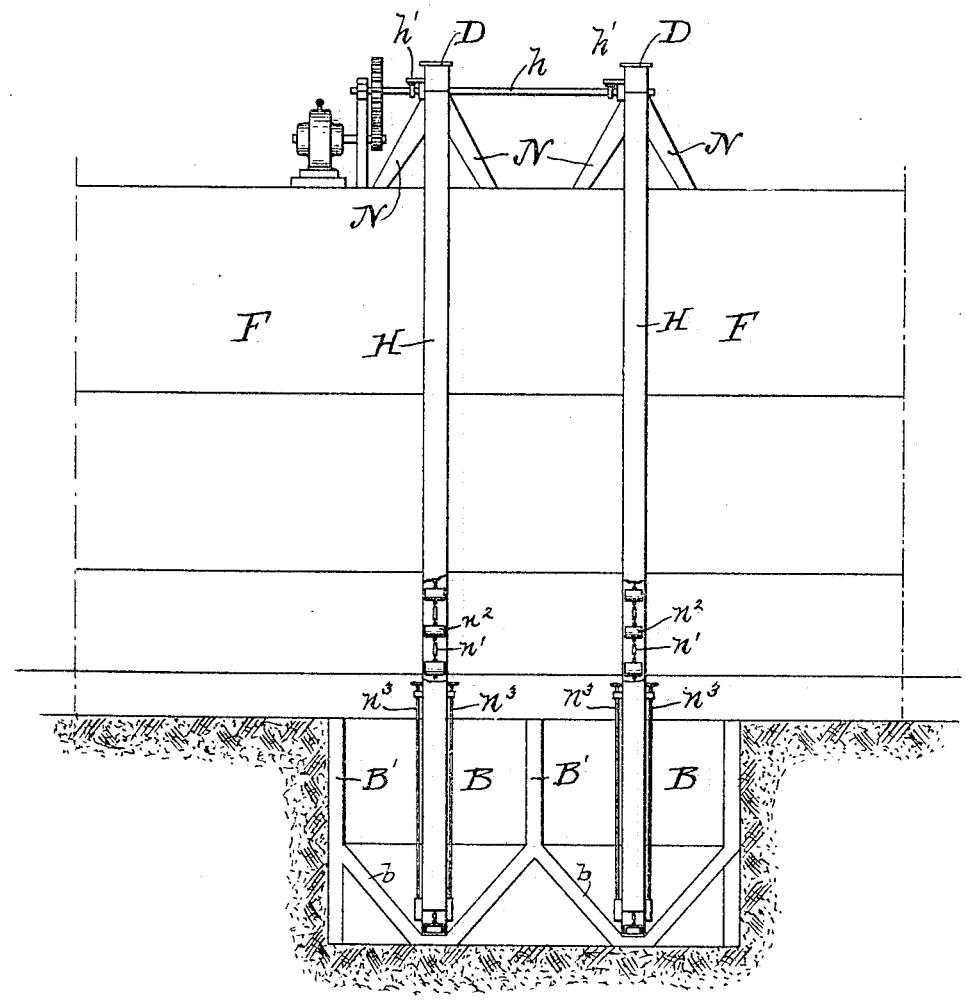
Figure 4:
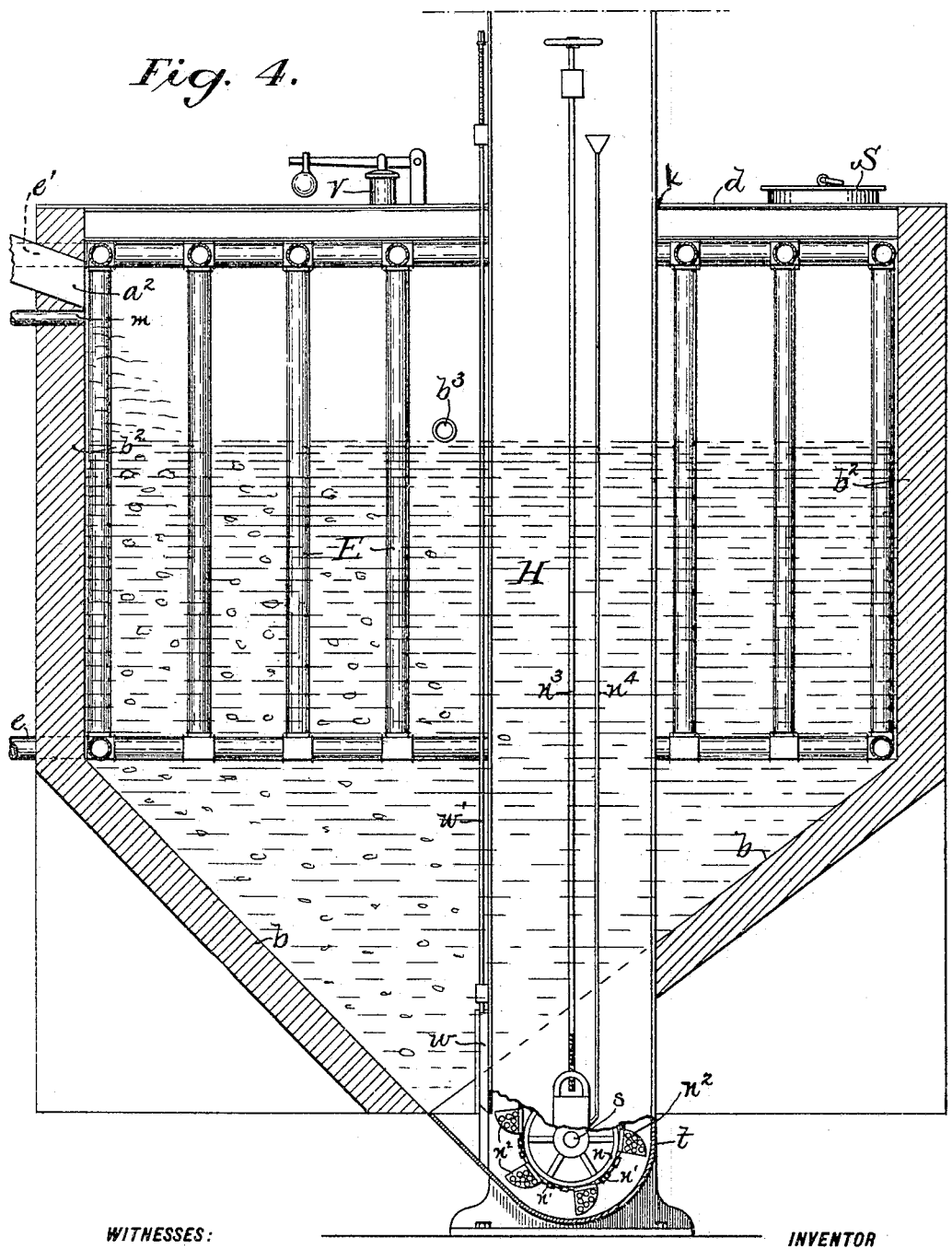
Figure 5:
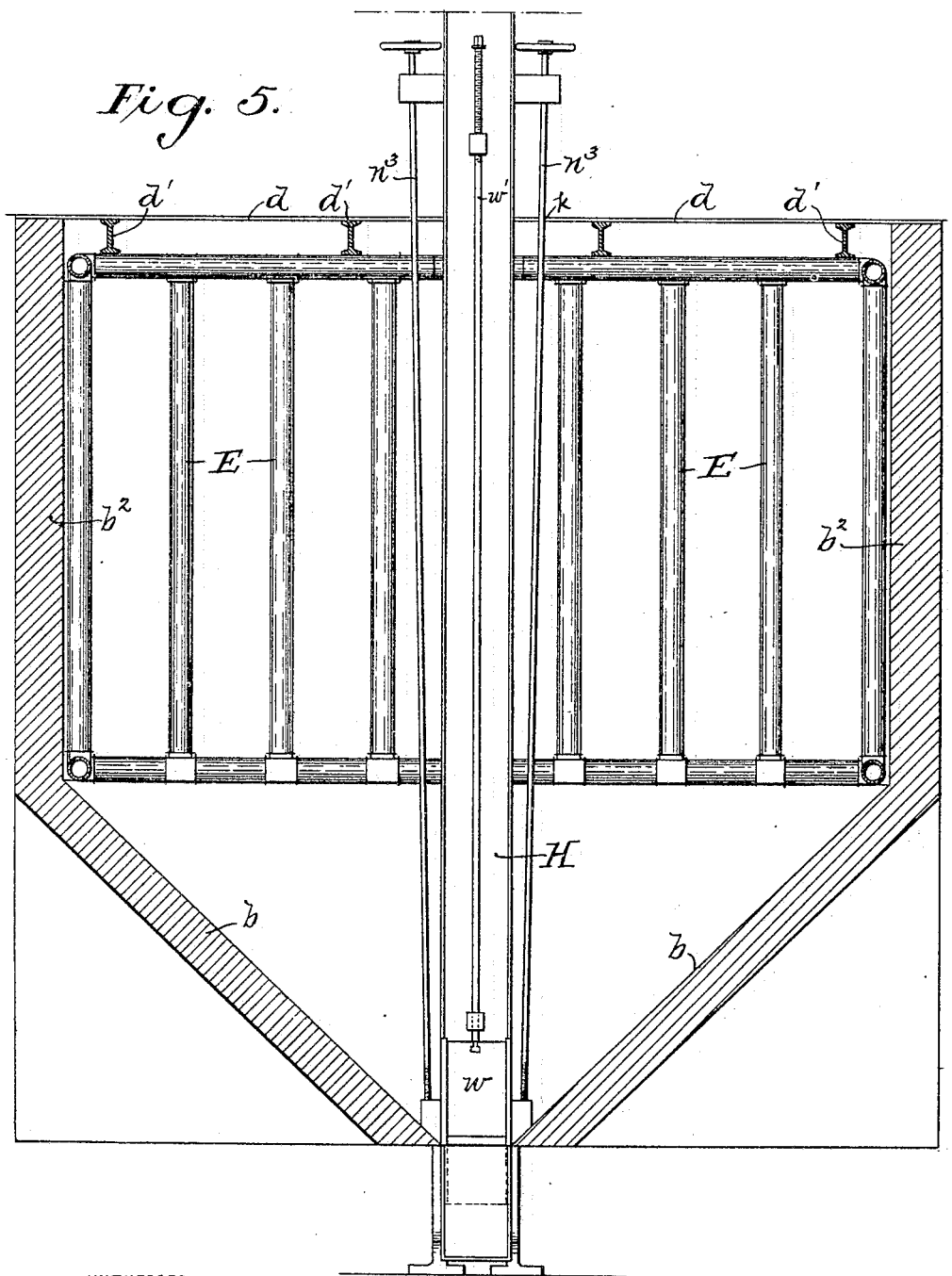
Figure 6:
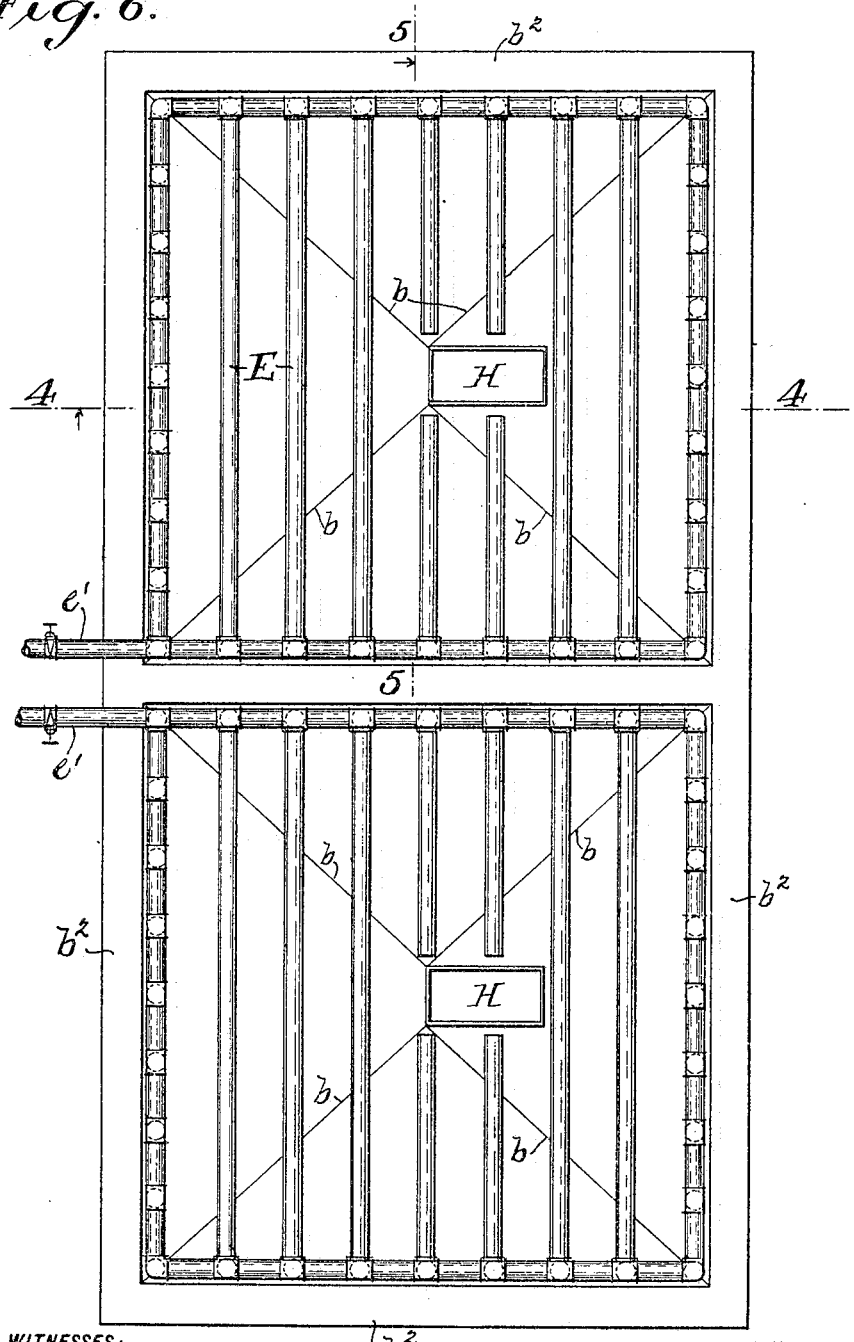

In the accompanying drawings, illustrating my invention, Figure 1 is a side elevation representing a blast-furnace, its cinder-runs, the slag-pit, the slag-conveyer operating therein, and a receiver or conveyer into which the slag is discharged. Fig. 2 is a plan view representing diagrammatically the furnace, cast-house, the slag-pit, the conveyer, means to drive the conveyer, and a system of slag conveyer and receiver. Fig. 3 is an end elevation showing the pit made in duplicate, the endless-chain slag-conveyers, and means to drive the same. Fig. 4 is a side elevation, partly in section, on the line 4 4 of Fig. 4 of the pit, the endless-belt slag-conveyer, and a system of piping within the pit for the utilization of heat from the slag; and Fig. 5 an end elevation thereof on the line 5 5 of Fig. 6. Fig. 6 is a plan view in section of the piping system in the pit; and Fig. 7 is a modification of the apparatus shown in Fig. 1, wherein the pit is constructed with a single inclined side, a discharge-gate in its vertical wall, and the endless-belt conveyer operating outside instead of inside the pit.

Referring now to said drawings, A indicates the smelting-furnace, and $a\ a$ the usual cinder-runs discharging into conduit $a'$, leading directly to the pit B, Fig. 1, or by branches $a^2$ to duplicate pits B B' of like character, Fig. 2. In Fig. 2, C indicates the cast-house and the conduit leading thereto, into which the molten metal is discharged from the furnace A.

The first element of my new apparatus consists of the pit. It is an excavation in the ground, with concreted bottom and walls; but it is provided with an inclined vertical wall or walls whereby the slag is delivered by gravity to a place or part thereof comparatively small in area at or near the bottom of the pit. In Fig. 1 the pit is shown with four oppositely-disposed vertically-inclined walls $b\ b$, and so, also, in Fig. 2 by the lines $b'$. Hence the slag is delivered by gravity to a space at the bottom of the pit, conical or reduced in area, in which the lower end of the endless conveyer D and its adjunctive parts are located. In the modification shown in Fig. 7 there are but three vertically-inclined walls, (the fourth wall being perpendicular,) the slag being discharged through an opening in this base of reduced area, alongside of which opening and outside thereof the endless conveyer and its adjunctive parts are located and operate.

In building the pit I prefer to extend the upper portion $b^2$ of the concrete walls thereof above the level of the ground and provide in such walls on such level an exhaust-water port $b^3$, (see Fig. 4,) screened, as usual, to prevent slag entering it or discharging through it. In said Fig. 4, as in the other views, the side walls are perpendicular at top, as at $b^2$, the inclined portion $b$ beginning at or below midway of the height. This is advantageous, as it enables me to arrange within the pit a series of piping E (see also Figs. 5 and 6) for the heating of air or water, a convenient arrangement of which is shown in said views, wherein an inlet-pipe $e$ and an outlet-pipe $e'$ are provided. It must be understood that the pit is covered at top $d$, the usual covering employed being either a metal plate or concrete, the only slag-inlet to the pit being through the inlet-conduit $a'$. A preferable method of supporting the piping E in the pit is shown in Fig. 5, wherein the top $d$ is reinforced concrete built on beams $d'$, to which the piping E is clamped or otherwise secured in any appropriate way.

In all devices for slag removal it is necessary to granulate the slag discharged from the furnace; otherwise it would form hard cakes when it chills. Granulation makes it friable and is commonly effected by a stream of water caused to contact with the molten slag on its entering the pit from the cinder-runs, for which purpose a supply-pipe, as at $m$, Fig. 4, is usually employed and is also used by me with my form of slag-pit. The water-level in the pit is indicated by the series of broken lines in said Fig. 4, wherein also is shown the granulated slag $x$, which under the action of the water plus the dropping of the molten slag into the water assumes a granular form resembling generally spherical-shaped particles fibrous and porous in character and about the size of a buck-shot. Necessarily this process of granulation fills the pit with a moving body of water heated to great temperature by the molten slag entering through the cinder-runs. This heat has never before been utilized. It is obvious that this water is heated by the slag to a temperature much above boiling-point, the fact being that nearly half of the water is converted into steam. In the top $d$ of the pit a discharge-port for this steam must be provided, such as a light-weighted safety-valve V. (See Fig. 4.) The piping E being immersed wholly in this body of slag-heated water and steam may serve for heating water caused to pass through it to be utilized for heating a building or supplying a boiler or for other analogous purpose. The piping E may be equally advantageously used for heating a current of air caused to pass through it to be utilized for driving a motor to actuate the endless conveyer, dry the granulated slag preparatory to making cement of it, or for other purposes.

An advantageous form of my pit and conveyer system is that shown in Figs. 2 and 3, wherein two pits B B (or a series, if need be) are built side by side, the endless conveyers being duplicated—that is to say, one for each pit arranged in like series—the several conveyers in the series discharging into a common bin or receiver, such as indicated at F in Figs. 1, 2, and 3. That system may be further extended by supplying in such bin an endless-carrier belt, as at $f$, or by supplying a horizontal series of outlets G, whereby the slag can be discharged on a train of freight-cars. Another advantage of building my pit and conveyer system in duplicate or series is that the several endless conveyers which lift the slag from the pit may be operated from a single shaft $h$, with clutch devices $h'$, whereby any one or more of the conveyers in the system may be thrown out of operation. This shaft is driven by any suitable motor or other power. The drawings Figs. 1 and 2 show a steam-engine and Fig. 3 an electric motor; but it is obvious that the power required to drive the shaft $h$ may be conveyed by a gearing or by a belt from any suitable source of power-supply. It is to be understood that when the device is constructed in pairs or series and one of the conveyers in the system is thrown out of action then the corresponding pit is thrown out of action or rather the slag and water prevented from entering therein by closing the slag-gate $h^2$ (see Fig. 2) and by closing a valve governing the water-supply.

In the construction of the pit, whether single or in series, the top plate or covering $d$ is to be provided in addition to the steam-exit V, Fig. 4, with a manhole S or other easily-removable part of the top plate, whereby access may be had to the interior for repairs, cleaning, or otherwise. Said top plate or cover $d$ is also to have an opening therein at $k$ corresponding to the shape of the casing H, which incloses the endless slag-conveyer, except in the modified form shown in Fig. 7, wherein the endless conveyer is arranged outside of the pit.

The means employed in my apparatus for immediately discharging the slag from the base of the pit is shown in Figs. 1, 4, and 7. It consists of a box, technically called a "boot," (indicated at $t$, Fig. 4,) and it is bolted down to and in a recess at the base of the pit. Two of its opposite vertical walls are bored to receive the bearing for a transverse shaft S. This bearing is to be covered and protected from water and sand, such as that used to cover the shaft-bearings of a boat-propeller. This shaft S carries the sprocket-wheel $n$, around which the bucket-chain $n'$ passes, this bucket-chain carrying a series of buckets $n^2$, which are perforated to drain the slag of water as it is caught up by the buckets. A corresponding sprocket-wheel $n$ (see Fig. 1) is arranged at the top of the conveyer. A belt or chain tightener $n^3$ is provided, as usual; also, a lubricating-oil pipe $n^4$, (see Fig. 4,) and the boot or box $t$ is provided with the usual leg casing or covering H, inclosing the moving chain and its buckets. It is desirable to galvanize the chain and its buckets to prevent oxidation from the wet slag and relieve the cutting due to the attrition of the slag. An inlet-gate W, governed by an operating-rod $W'$, Fig. 4, is provided to slide on the outside of and over an opening in the end wall of the boot. Other forms of bucket conveyer of this type or other suitable means for withdrawing or discharging the granulated slag from the pit may be substituted in my apparatus with like effect. My present invention, hereinafter claimed, is not limited to the use of any particular slag-discharging mechanism.

The operation of the apparatus is as follows: Slag is discharged from the furnace through the cinder-runs to the slag-pit and is granulated at the mouth of the latter by contact with the water entering therein through the water-inlet pipe $m$. The overflow discharges through port $b^3$. (See Fig. 4.) The granulated slag is delivered to the reduced and comparatively small basal portion of the pit, wherein the lower end of the endless conveyer and its boot portion are located. The gate W being previously opened by operating its handle W', the slag enters the boot and is caught up by the buckets mounted on the endless-chain conveyer, which is driven, through its sprocket-wheels, by the driving-belt. (See Fig. 1.) The buckets when they reach and pass over the upper sprocket-wheel discharge their contents into the conduit or conduits N, (see Figs. 1, 2, and 3,) from which it passes to any suitable receiver or to the temporary receiving-bin F, Fig. 2, and from thence, if desired, to a series of cars on a siding.

Having thus described my invention, what I claim as new, and desire to secure by Letters Patent, is—

1. In an apparatus of the class described, the combination with the cinder-runs of a furnace or other source of molten-slag supply, of a slag-pit having a covered top with a steam-outlet therein and means to govern it, means to supply water to the pit at or about the point where the molten slag enters the pit, a water-overflow therein, a series of piping arranged within the upper portion of the pit, with inlet and outlet tubular connections leading to the exterior of the pit; and means to discharge the granulated slag from the pit.

2. In an apparatus of the class described, the combination with the cinder-runs of a furnace or other source of slag-supply, of a slag-pit having inwardly-sloping walls near its basal portion, and a covered top with a steam-outlet therein and means to govern it, means to supply water to the pit at or about the point where the slag enters the pit, a water-overflow therein, a series of piping arranged within the upper portion of the pit, with inlet and outlet tubular connections leading therefrom to the exterior of the pit, and a slag-discharging device having its inlet end adjacent to the basal portion of the pit.

3. In an apparatus of the class described, the combination with the cinder-runs of a furnace or other source of slag-supply, of a slag-pit constructed with two or more adjacent chambers each having walls which slope inwardly near and toward the basal portion, means to severally control the slag-inlets thereto, means to supply water to the slag as it enters the pit, means to carry off the overflow of said water, a slag-discharging conveyer in each of said pit-chambers having its inlet end in the basal portion thereof, a single shaft operating the several conveyers in the series, clutch mechanism operating to severally throw the conveyers out of action, means to govern the inlet to the conveyer, and means to receive and discharge the slag delivered thereto from the conveyers.

In testimony whereof I have hereunto affixed my signature this 9th day of January, A. D. 1904.

THOMAS COBB KING.

Witnesses:
    CHAS. W. MILLER,
    GEO. A. JENNES.